(12) United States Patent
Bienas et al.

(10) Patent No.: US 12,028,908 B2
(45) Date of Patent: Jul. 2, 2024

(54) RANDOM ACCESS IN A SATELLITE COMMUNICATION SYSTEM

(71) Applicant: IPCom GmbH & Co. KG, Pullach (DE)

(72) Inventors: Maik Bienas, Schöppenstedt (DE); Andreas Schmidt, Braunschweig (DE); Martin Hans, Bad Salzdetfurth (DE)

(73) Assignee: IPCom GmbH & Co. KG, Pullach (DE)

( * ) Notice: Subject to any disclaimer, the term of this patent is extended or adjusted under 35 U.S.C. 154(b) by 592 days.

(21) Appl. No.: 17/279,106

(22) PCT Filed: Oct. 15, 2019

(86) PCT No.: PCT/EP2019/077945
§ 371 (c)(1),
(2) Date: Mar. 24, 2021

(87) PCT Pub. No.: WO2020/078992
PCT Pub. Date: Apr. 23, 2020

(65) Prior Publication Data
US 2021/0352738 A1    Nov. 11, 2021

(30) Foreign Application Priority Data

Oct. 15, 2018  (EP) .................... 18200419

(51) Int. Cl.
*H04B 7/01*        (2006.01)
*H04W 24/10*    (2009.01)
(Continued)

(52) U.S. Cl.
CPC .......... *H04W 74/0841* (2013.01); *H04B 7/01* (2013.01); *H04W 24/10* (2013.01); *H04W 84/06* (2013.01)

(58) Field of Classification Search
CPC ................ H04B 7/185; H04B 7/18502; H04B 7/18504; H04B 7/18506; H04B 7/18508;
(Continued)

(56) References Cited

U.S. PATENT DOCUMENTS 11,343,857 B2 *   5/2022   Taherzadeh Boroujeni ...............
                                                            H04B 7/18513
2009/0284411 A1   11/2009  Tessier
(Continued)

FOREIGN PATENT DOCUMENTS

CN       108243391 A1   7/2018
EP         3030018 A1   6/2016
(Continued)

OTHER PUBLICATIONS

Thales et al: "NR-NTN: TP for Chap 7.3 NR modifications to Support NTN", 3GPP Draft; RP-181394_CHAP 7.3REV, 3rd Generation Partnership Project (3GPP), Mobile Competence Centre ; 650, Route Des Lucioles ; F-06921 Sophia-Antipolis Cedex ; France, XP051512027.

*Primary Examiner* — Bo Hui A Zhu
(74) *Attorney, Agent, or Firm* — Proi Intellectual Property US; Klaus Michael Schmid (57) ABSTRACT

The present invention provides a method of performing by a UE device a random access attempt in a communication system comprising at least one non-terrestrial transmission station, the method comprising receiving reference signals transmitted by the non-terrestrial transmission station; determining from the received reference signals a trip time between the UE device and the non-terrestrial transmission station; and using the trip time to control the random access attempt.

6 Claims, 9 Drawing Sheets

(51) Int. Cl.
*H04W 74/0833* (2024.01)
*H04W 84/06* (2009.01)

(58) Field of Classification Search
CPC .............. H04B 7/1851; H04B 7/18513; H04B 7/18515; H04B 7/18517; H04B 7/18519; H04B 7/18521; H04B 7/18523; H04B 7/18526; H04B 7/18528; H04W 84/06
See application file for complete search history.

(56) References Cited

U.S. PATENT DOCUMENTS

| | | |
|---|---|---|
| 2015/0131579 A1 | 5/2015 | Li et al. |
| 2016/0173188 A1 | 6/2016 | Uchino et al. |
| 2017/0085329 A1 | 3/2017 | Ravishankar et al. |
| 2017/0367116 A1 | 12/2017 | Li et al. |
| 2018/0152904 A1 | 5/2018 | Xirouchakis et al. |
| 2021/0029658 A1* | 1/2021 | Mahalingam ..... H04W 56/0045 |

FOREIGN PATENT DOCUMENTS

| | | |
|---|---|---|
| JP | 200169058 A1 | 3/2001 |
| WO | 0239622 A1 | 5/2002 |
| WO | 2016182052 A1 | 11/2016 |
| WO | 2017072745 A1 | 5/2017 |

* cited by examiner

RANDOM ACCESS IN A SATELLITE COMMUNICATION SYSTEM

The present invention relates to performing a random access attempt in a satellite based communication system.

Satellite communication or satellite telephone systems are well known for over 20 years. An example is the Iridium telephone and data communication system. We refer to publicly available technical descriptions of the system and provide details only were necessary for the current invention.

A paper by I. Koutsopoulos and L. Tassiulas entitled "Reliable handover prediction and resource allocation in MEO mobile satellite networks", Proceedings of IEEE/IMACS Circuits, Systems, Communications Conference 1999, Athens, Greece, discusses handover prediction with the steps: Base station requests measurements of a list of satellites including those that should be in coverage and those potentially approaching (similar to "neighbour cells"), UE measures the received beams of these satellites (periodically) and provides the list with measurements back. The entries in the list (filtered by thresholds and duplicate detection) are weighted according to their angel to the UE (azimuth and elevation) and from that a handover decision is taken. The paper does not disclose or suggest any methods to derive a transmit time for a random access preamble.

US 2009/0284411 A1 describes a method of using a GPS receiver to identify visible GPS satellites and positions and generate a map of the open sky. This map is than used to identify whether any and which communication satellites can at all be reachable through the open sky using knowledge about their movements and only start communication to those satellites or postpone communication. There is no configuration of a transmit time for a random access preamble.

Further satellite based communication systems are described in US 2017/0085329 A1, WO 2017/072745 A1 and WO 02/39622 A1.

Iridium uses low-Earth-orbiting (LEO) satellites with 6 orbits and 11 satellites per orbit. The satellites have a height of 781 km and an orbital period of about 100 minutes which results in the time $\Delta T_{sat}$ between two neighbouring satellites in the same orbit passing the same point over ground is about 9 minutes.

Currently the next generation of mobile communication standards (5G) is defined by 3GPP. It will define a network architecture for a core network (5GC) and a new radio access network (NR). In addition, access to the 5GC from non-3GPP access networks is provided for.

3GPP is in the process of including non-terrestrial access network (NTN) support into NR. A new study was proposed in 3GPP Tdoc RP-171450 in which a NTN is defined as a network, or segment of a network, using an airborne or spaceborne vehicle for transmission. Spaceborne vehicles include satellites (including LEO satellites, medium Earth orbiting (MEO) satellites, geostationary Earth orbiting (GEO) satellites as well as highly elliptical orbiting (HEO) satellites). Airborne vehicles include unmanned aircraft systems (UAS) including high altitude UAS platforms (HAPs), tethered UAS, lighter than air UAS (LTA) and heavier than air UAS (HTA), all operating in altitudes typically between 8 and 50 km, quasi-stationary.

The declared aim of 3GPP is an incorporation of NTN support into the NR. Thus, it is not proposed to allow known satellite communication technologies like Iridium to access the 5GC. It is proposed to include necessary enhancements into the currently developed NR standard to enable operation over the non-terrestrial vehicles described above.

This aim opens a wide range of innovation necessary to allow efficient communication between a UE and a NTN base station or an NTN transceiver. 3GPP decided to postpone the start of work on NTN until early in 2018.

The most likely deployment model for NTN NR base stations or transceivers are quasi-stationary HAPs and LEO satellites (LEOs). This invention enhances the incorporation of LEOs, MEOs and HEOs into NR.

A deployment model may be that LEOs are operated by a satellite operator who offers its NTN access to mobile network operators (MNOs) as a shared radio network access, as defined by 3GPP since 3G. The shared NTN RAN would complement the MNO's terrestrial RAN. Each satellite may contribute to the shared RAN in its current coverage area so that a shared RAN used by a specific MNO is offered by multiple satellites dynamically changing as the satellites follow their path through the orbit.

For NTN deployments in general, two architectural alternatives exist. The satellite may constitute a base station with all the typical base station intelligence. In this deployment, the base station is connected to a ground station via satellite link, the ground station connecting the satellite to the respective core network. Alternatively the satellite essentially constitutes a repeater which routes data between a UE and a ground station which is the actual base station. This deployment is often called "bent pipe" deployment.

For the current invention, we use the model with a satellite comprising the base station if not otherwise mentioned. This is only to ease readability and should not cause any loss of generality. The ideas of this invention are valid for the bent pipe deployment as well.

The radio interface for NR will be designed to operate under conditions, where the maximum distance between the UE and the base station is 100 km (typically below 20 km). In contrast to this, the distance UE-to-satellite is between 780 km and 2.050 km for LEO satellites and even more for satellites of other (higher) orbit types. This will lead to several issues, at least based on the additional signal trip time for satellite communication compared to terrestrial communication.

Figure 7:
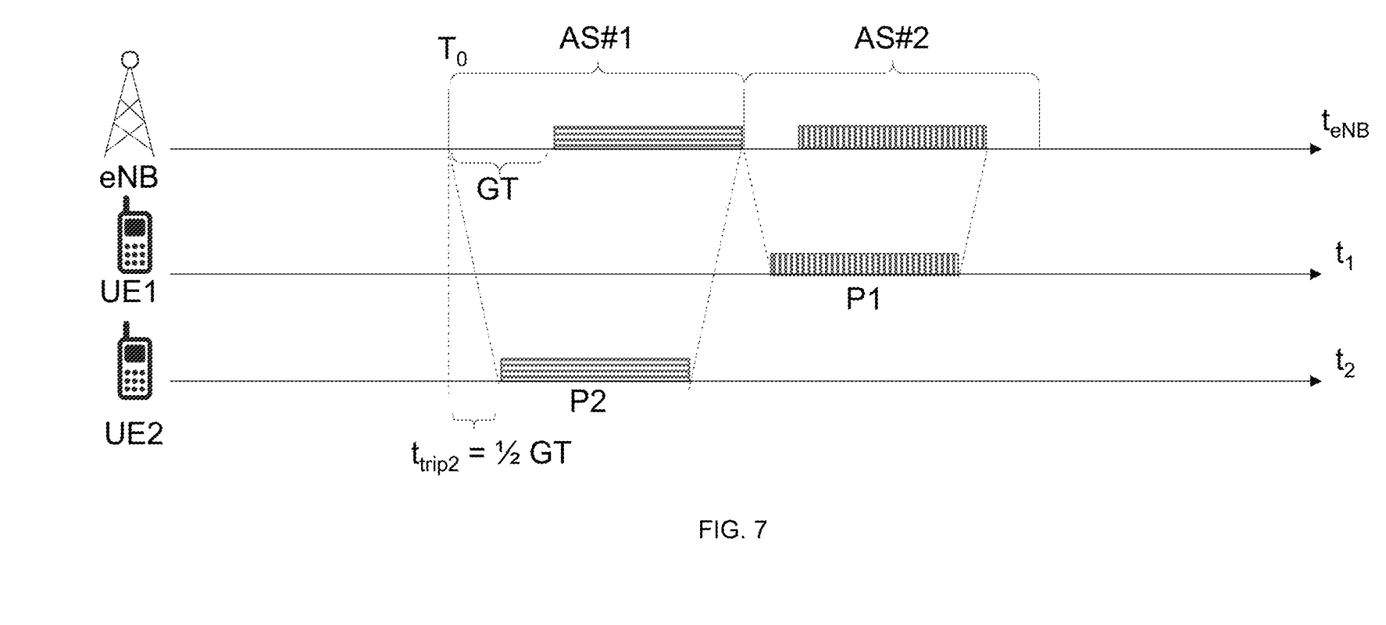
FIG. 7 shows the transmission of random access preambles by two UEs in a terrestrial communication system.

LTE and new radio are using the slotted ALOHA principle for random access. The principle requires that random access preambles will reach the receiver within the timely boundaries of so called access slots. Therefore, the slotted ALOHA principle is sensible for situations where preambles are received from UEs with different signal trip times. For example, the maximum trip time difference of different UEs connected to the same base station that is acceptable for the current random access procedure of LTE is 0.358 ms (=½*guard time of preamble format 3, as described in 3GPP TS 36.211; E-UTRA; Physical Channels and Modulation, Table 5.7.1-1) which relates to a maximum cell size of approximately 119 km. Random access preambles, that are transmitted simultaneously by UEs that are closer to the base station than 119 km, will always reach the base station within the boundaries of the same access slot. Therefore, a guard time is included in these access slots, i.e. the access slot is about the guard time longer than the preamble length plus the cyclic prefix. The timing for the random access preambles is depicted in FIG. 7 in which $T_0$ is a time at the base station, when a first access slot AS #1 starts. Due to the distance of the UEs and the base station, the perceived start time at the UEs is about the relating trip time later (shown as $t_{trip2}$ for UE2). UE2 has selected AS #1 for transmission of random access preamble P2. The preamble is received about 2*$t_{trip2}$ later than $T_0$. In this example UE2 is at the maximum allowed distance to the eNB, i.e. $t_{trip2}=½$ GT (guard time). Therefore, the end of P2 is received at the end of AS #1 and this will lead to a successful reception at the eNB. UE1 is closer to the eNB and has selected AS #2 to transmit the preamble P1, which is received within the boundaries of AS #2 by the eNB. Also this transmission was successful.

Preamble reception within access slot boundaries is important, as the addressing for the reply message is based on the reception timing, i.e. UEs are awaiting a response to their sent preambles a certain time after transmission of this preamble. Further, reception of the preambles within the access slot is important, in order to avoid collisions with the same preamble sent in an adjacent access slot.

If the current configuration of LTE was applied to a satellite link, the random access preambles transmitted by a UE according to the LTE specifications will not be received within the boundaries of the selected access slot. Therefore, the addressing of the response messages will fail, as there is no reliable relation between the access slot used for preamble transmission and the access slot of preamble reception. Without adaption of the NR random access configuration parameters to the satellite link properties, random access would not be possible at all.

Figure 8:
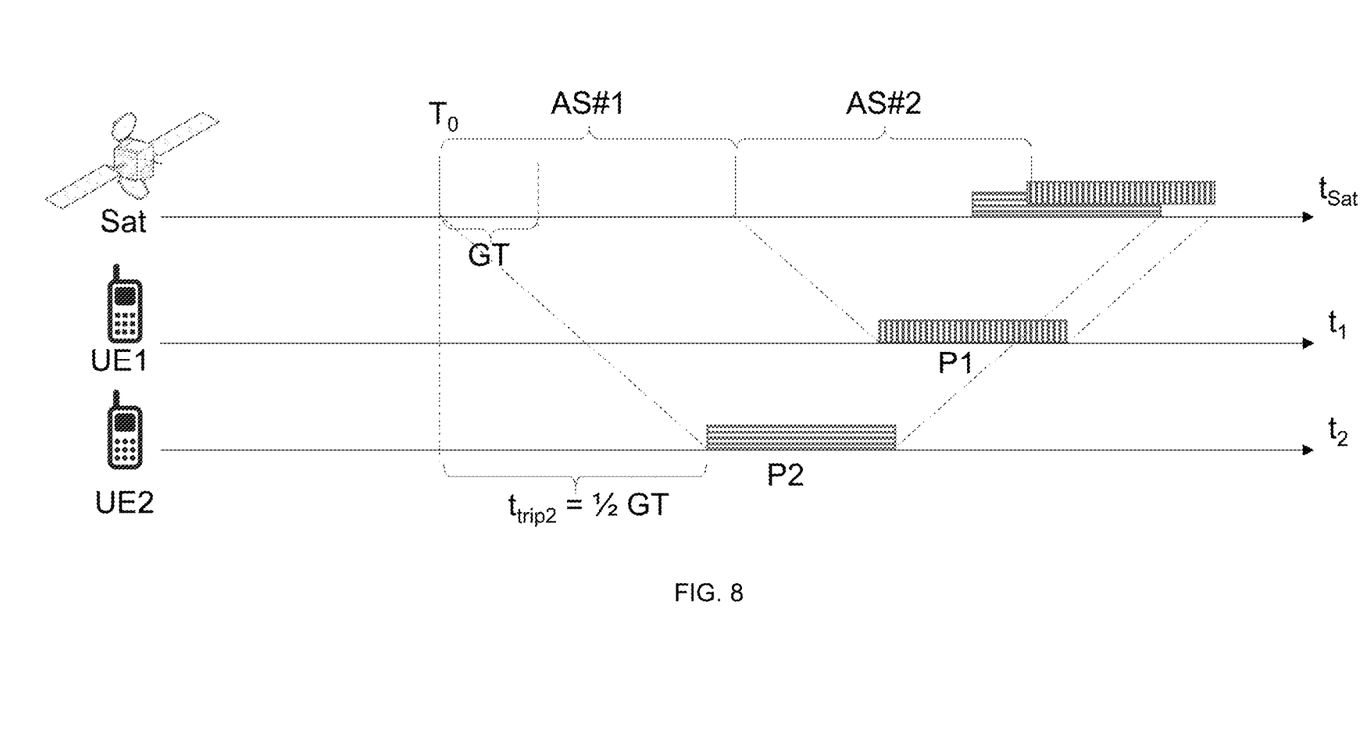
FIG. 8 shows the transmission of random access preambles by two UEs in a satellite based communication system in a conventional manner.

In FIG. 8 the timing for random access in case that the LTE random access configuration was used over a satellite connection is depicted. The trip time of UE2 is much larger than half the guard time. Therefore P1, that is intended for AS #1, is received far beyond the boundaries of AS #1. In addition, P2, that is intended for AS #2, is received simultaneously with P1 which will lead to a collision.

An obvious solution would be, to enhance the guard interval to be sufficient for the maximum trip time difference of different UEs connected to the same satellite. This value could be calculated as 14.32 ms (i.e. the distance differences of satellite links are approximately 20 times larger than for terrestrial links. This factor is to be applied to the guard period). Such a long guard period will result in an inacceptable low RACH capacity, so that this configuration is not able to provide initial access for the given scenario. The capacity could be increased, by using longer preambles. But this would increase the required processing power of the base station and would add additional latency to the random access procedure.

A more convenience solution is described in US 2016/0173188 A1. The idea described therein is to select the preamble transmission time in a way, that leads to a reception time at the satellite, almost synchronous with a given time grid at the receiver. This synchronicity is independent of the distance UE-to-satellite. Or, in other words, the transmit delay is compensated by using a transmission timing that is approximately about the transmit delay earlier. The issue with the proposed solution is, that a reference UE is required, which supports the UE by obtaining the current trip time. Without such reference UE, the solution could not be used. As described, the UE does not determine a trip time from received signals. Rather, geographical information is used to calculate a trip time.

Beside the issues of preamble reception caused by the longer trip times, also the reception of the random access response is affected. For LTE, the response window interval is semi-statically configured by the network. The value is common for all UEs in the related cell. The interval duration depends on the trip time UE-to-base station plus some processing time for the base station. It is configurable between 2 and 10 ms. Longer values will be suited for longer trip times and enable the base station to select the response time individually within this time span, but on the other hand a long response window leads to a larger delay in the random access procedure.

When this concept is applied for a satellite link, the shortest interval has to cope for the maximum expectable round trip time. This would be 14 ms in case of LEO satellites. For UE's which are close to the satellite, a much shorter interval would be sufficient, e.g. 6 ms for LEO satellites. But due to the common configuration also these UEs have to use the longer interval. Therefore, the delay for random access could not be configured optimal.

The present invention provides a method of performing by a UE device a random access attempt in a communication system comprising at least one non-terrestrial transmission station, the method comprising receiving reference signals transmitted by the non-terrestrial transmission station; determining from the received reference signals a trip time between the UE device and the non-terrestrial transmission station; and using the trip time to control the random access attempt.

One aspect of the invention is a method to obtain a signal trip time from measurements of reference signals transmitted by a satellite. This trip time may be used firstly to compensate the trip time of random access preambles, so that an almost synchronous reception timing is obtained at the satellite and a small guard interval as typical for terrestrial communications will be sufficient to avoid collisions of preambles sent in different access slots by UEs with different distances to the satellite.

Secondly, the trip time may be used to determine a time interval of an expected response to a random access preamble successfully received at the satellite. This interval is UE specific and derived individually by the UE for the current trip time.

Thirdly, one out of two random access methods is selected based on whether a timing can be determined based on measurements with a sufficient quality and fourthly, a method to derive the time interval of the response may be based on the selected random access method.

A UE may be enabled to perform the following:
  a signal trip time UE-to-satellite is obtained by reference signal measurement of:
    the reference signal power
    the difference of two or more successive reference signal power measurements with a certain period
    the Doppler Frequency of the received reference signal
    the difference of two or more successive Doppler Frequency measurements with a certain period
    any combinations of two or more measurements above.

Using downlink reference signals is beneficial, as they allow a UE in idle mode to derive the required trip time from already available signals, i.e. without the need to enhance the downlink signals about any new signal.

Future signal trip times UE-to-Satellite may be obtained by calculation with the latest obtained or confirmed signal trip time and a pre-configured function. This is beneficial, as no measurements are needed beyond the initial determination provided the respective function is known. This save time and battery resources.

The obtained trip time may be used by the UE, to transmit a preamble at approximately a time of the trip time earlier than an access slot boundary at the receiver. In other words: the selected access slot according to the timing perceived by the UE begins twice the trip timer later than the preamble transmit time selected by the UE. Perceived here means the access slot boundary is taken by the UE from downlink signals without time correction and therefore affected by the downlink trip time.

Applying this trip time compensation to long range links like UE-to-satellite links is beneficial, as the random access procedure for terrestrial communication could be re-used without capacity degradation.

The determined trip time may be further used to derive a response time interval during which a response from the satellite is expected. The receiver of the UE may be configured to receive a respective response in the derived time interval and if no such response is received, the latest preamble transmission is considered as not successful, i.e. either a new random access attempt is started or the random access is delayed for a certain time interval. The derivation may be based on the estimated trip time plus a pre-determined time for processing the random access preamble in the satellite. This variable interval is advantageous, as it reduces the latency compared to a semi-persistently configured interval, as used e.g. in LTE.

A measurement quality estimation may be determined based on the measurement performed and a random access method is selected based on the determined measurement quality.

The response time interval may be determined based on the selected random access method.

Further, the base station of the satellite provided link may be enabled to perform the following:
- to configure two independent sets of random access resources, a first set, for slotted-ALOHA based random access and a second for unsynchronised random access;
- to detect the used random access mode based on the random access resources selected by the UE;
- to select a time-delay $T_{delay}$, which is used in unsynchronised random access mode to indicate the beginning of random access response time interval and to transmit this parameter to the UE.

Even further, an entity of the communication network may be enabled to perform the following:
- expected values for RSS and Doppler frequencies for different phase times of the flight-over period of a satellite are transmitted to the UE;
- a threshold value used by the UE to consider a method to derive the trip time as unreliable is transmitted to the UE.

Preferred embodiments of the invention will now be described, by way of example only, with reference to the accompanying drawings in which.

Figure 9:
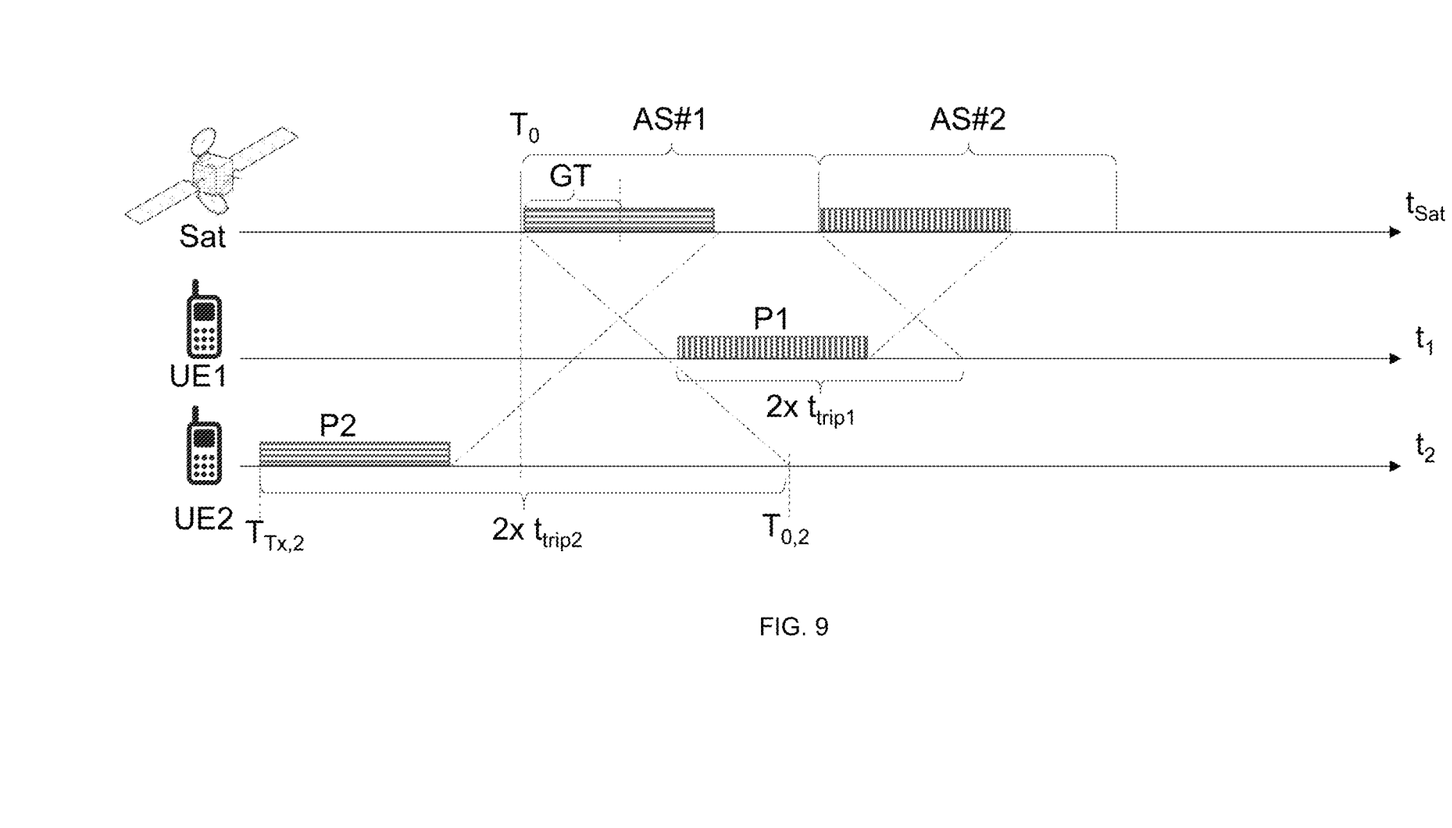
FIG. 9 shows as an example a timing of a random access attempt when trip time compensation is applied according to an aspect of the invention.

FIG. 9 shows as an example a timing of a random access attempt when trip time compensation is applied according to an aspect of the invention. A beginning of the preamble transmit time $T_{TX,2}$ of UE2 is selected so that a selected access slot begins twice the trip time later (at $T_{0,2}$), i.e. UE2 is selecting the transmit time as $$T_{Tx,2} = T_{0,2} - 2 \times t_{trip2}. \quad (1)$$

wherein $t_{trip2}$: is a trip time of signals transmitted from UE2 to the satellite Therefore, the reception at the satellite of the random access attempt takes place within given access slot boundaries. A small guard time only is required to compensate for measurement errors.

Figure 1:
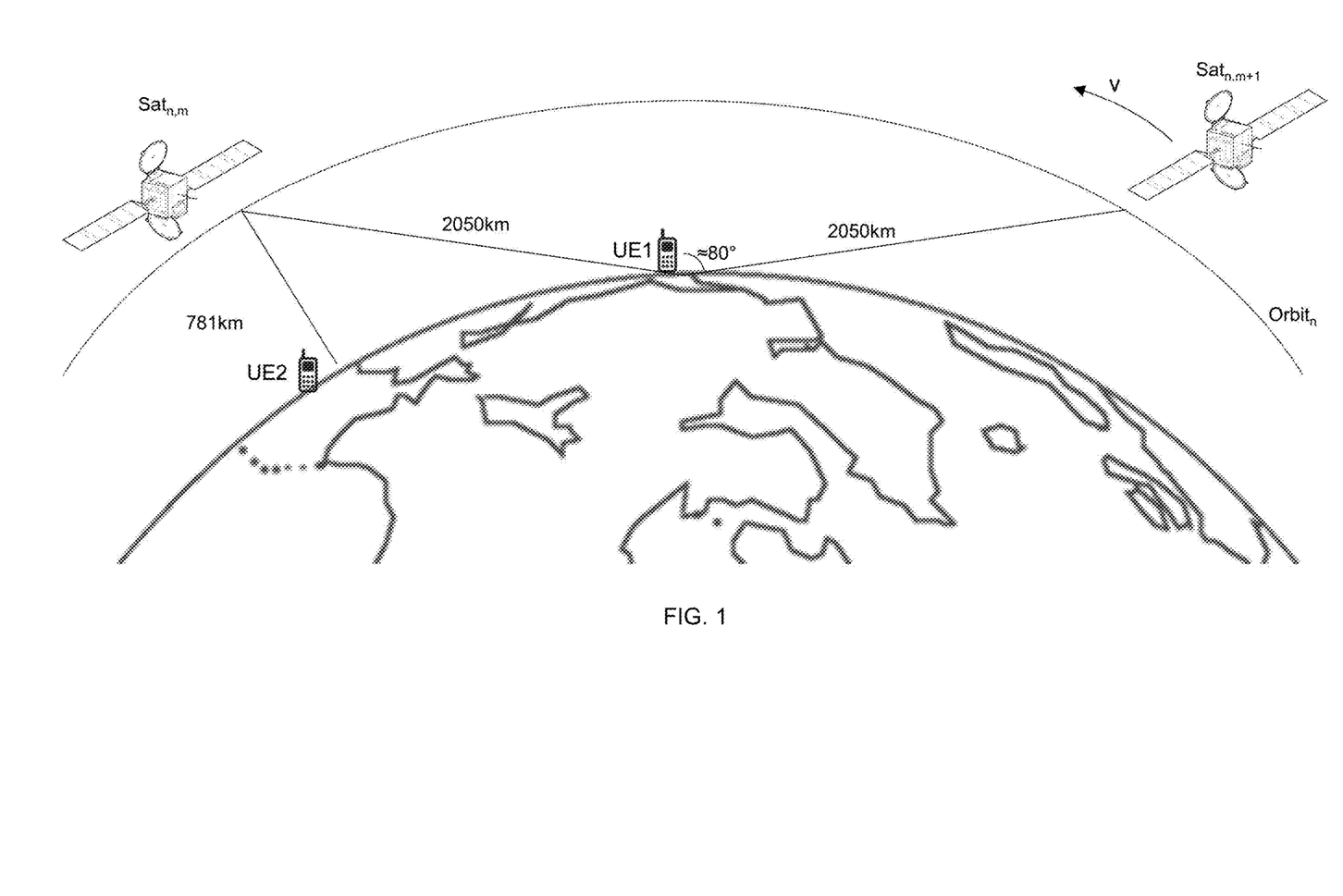
FIG. 1 illustrates differing UE-satellite distances in a satellite based communication system.

FIG. 1 shows an example radio access network 10 based on LEO satellites. The figure depicts two satellites ($SAT_{n,m}$ and $SAT_{n,m+1}$), where the index m iterates the satellites on the same orbit (orbit n), and two UEs (UE1 and UE2). In an exemplary manner, two typical distances for LEO satellites are referenced in FIG. 1: the height of the satellites over ground (781 km) and the typical distance of a satellite that becomes visible by a ground based point at typically about 10° over the horizon (2050 km). In this example UE1 is located at a distance of 2050 km to $SAT_{n,m}$ whereas UE2's distance is 781 km.

In the example, the time between a satellite appearing at the horizon and the same satellite disappearing on the opposite side is 9 minutes. It is apparent from FIG. 1 that the distance between a ground based UE and a satellite changes significantly, and therefore also the path loss and latency, within these 9 minutes in an essentially predictable way.

Figure 2:
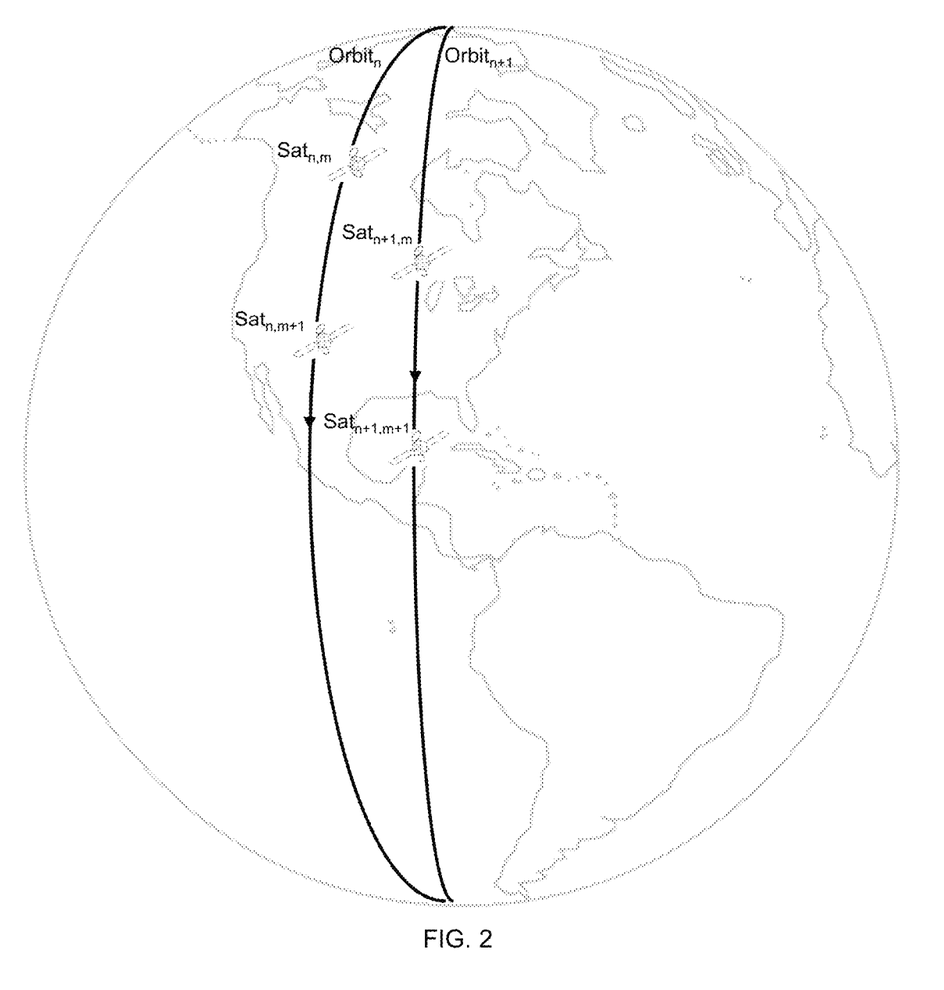
FIG. 2 illustrates an exemplary multi-orbit satellite system.

FIG. 2 shows a similar example setup with two orbits (orbit n and orbit n+1), where the index n iterates all the orbits a satellite radio access network may comprise, which is typically 6. On each orbit, only two satellites are shown (index m and m+1, respectively) where typically 11 satellites are present on the full 360°. The nearest satellites on neighbouring orbits may be offset by half the satellite distance on one orbit so that UEs that reside on the ground at a point between the orbit planes may be served by satellites of alternating orbits.

The setup of FIGS. 1 and 2 is an example similar to a LEO satellite based system currently deployed. The current invention is as well valid for other setups with different number of satellites, different number of orbits, different inclination of orbits, different height and satellite speed etc.

Figure 3:
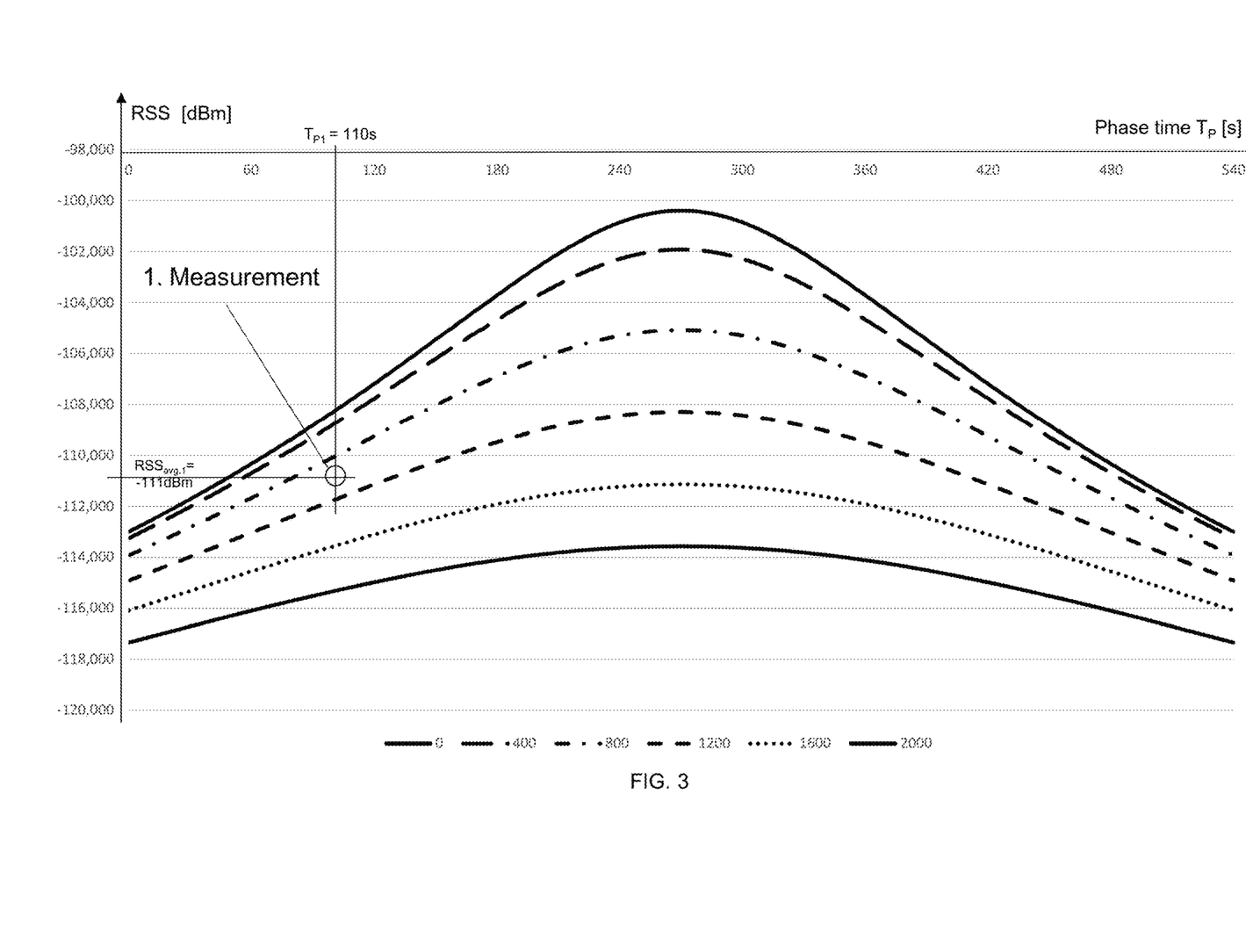
FIG. 3 illustrates a variation of received signal strength with time and distance to an orbit plane.

FIG. 3 depicts a diagram showing an example for an expected received signal strength (RSS) in dBm over the time in seconds during a single flyover of a satellite (9 minutes) shown for different distances to the orbit plane. The depicted time is the phase time $t_P$, which is "0", when the satellite becomes visible by a ground based UE, which is assumed to be when the satellite appears about 10° over the horizon. The phase time is 540 seconds, when the satellite disappears, i.e. is below 10° over the horizon.

The figure assumes a geometry according to FIG. 1 and the following formula for the RSS ($P_{RSS}$).

$$P_{RSS} = P_0 - 10 \ast n \ast \log_{10}(r/R), \quad (2)$$

where r is the current UE-to-satellite-distance according to the geometry in FIG. 1, R=2050 km is the max UE-Satellite-distance with maintained communication link, n=3 is the path loss exponent (n=2 is vacuum line of sight, n=4 is typical urban environment)

$P_0$ is the minimum RSS detectable by a typical UE, here set to −113 dBm

Figure 4:
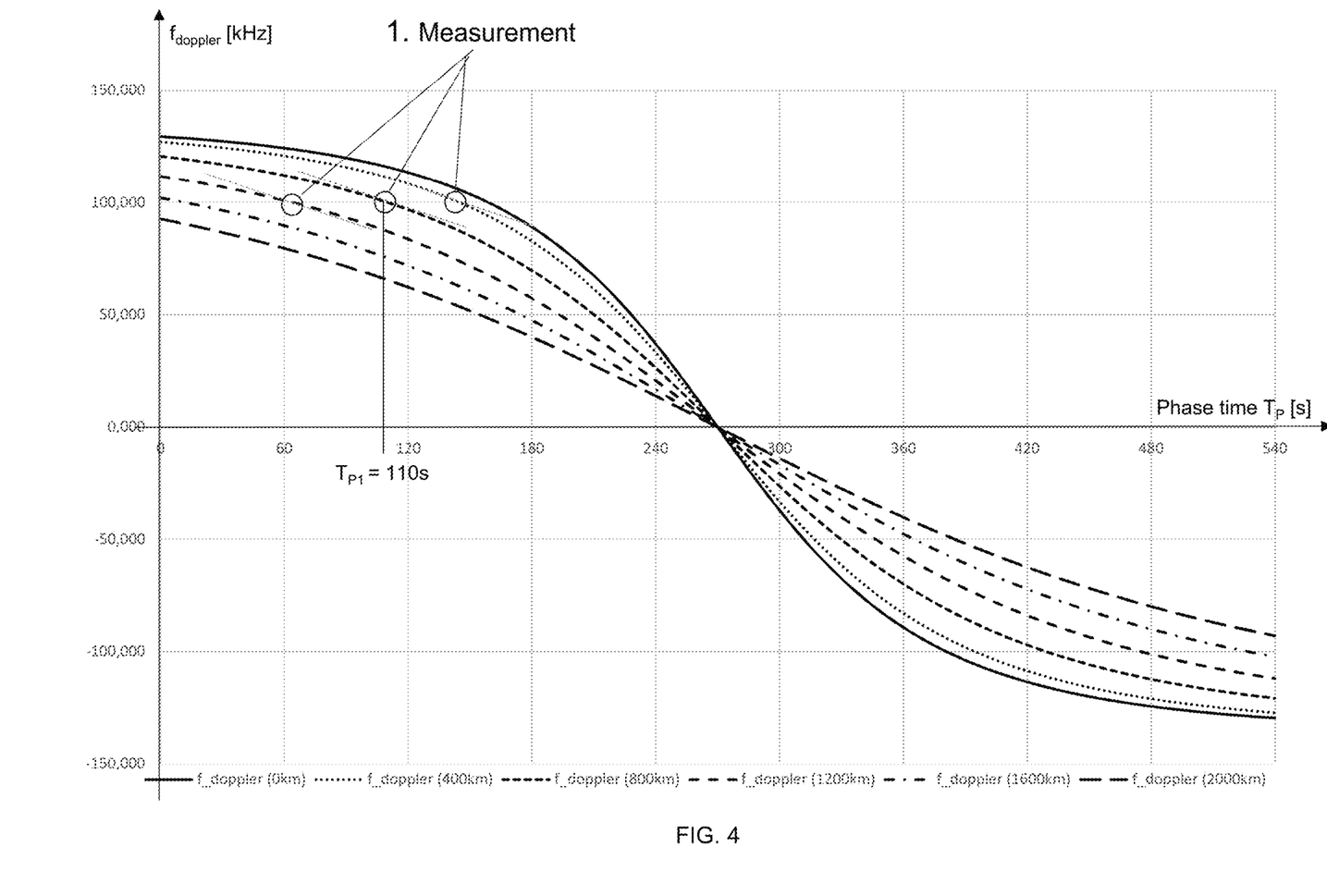
FIG. 4 illustrates a variation of Doppler shift with time and distance to a satellite orbit plane.

For the LEO satellite examples used throughout this invention, FIG. 4 shows the Doppler frequency $f_{Doppler}$ in kHz for a flyover period for a ground-based UE exactly on the satellite orbit plane (solid line) and for a UE which is 1000 km apart from the satellite orbit plane (dashed line). The Doppler frequency is shown for a carrier frequency of 3 GHz, other carrier frequencies would show linear deviations with respect to FIG. 4. As apparent, the Doppler frequency in this example has maximum values of about 130 kHz with respective opposite signs at the beginning and the end of a flyover period. In the phase of a steep angel between UE and satellite (i.e. the Satellite is in UE's zenith), the Doppler frequency falls quickly from +60 kHz to −60 kHz.

Figure 6:
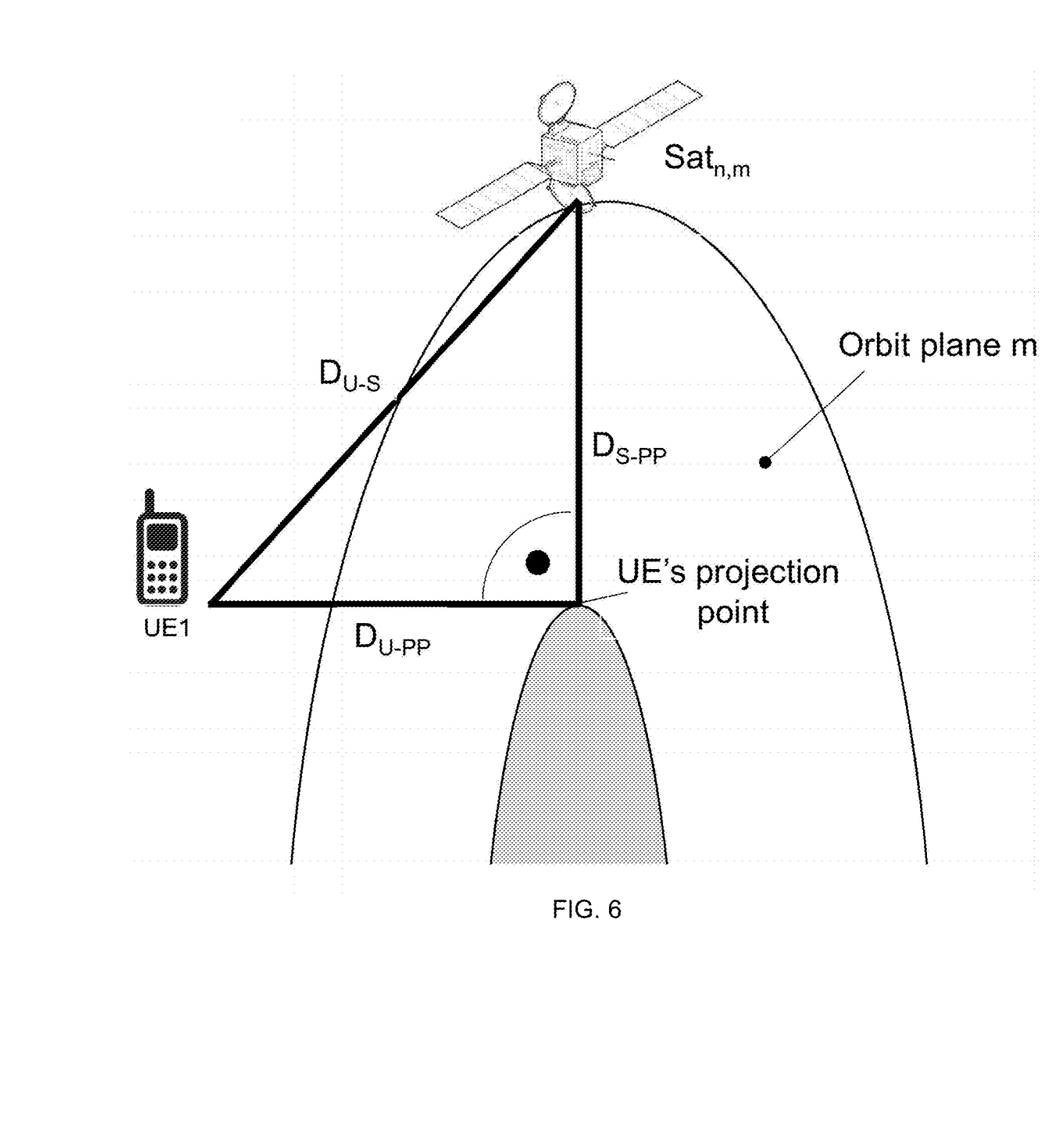
FIG. 6 illustrates relative distances for implementing the invention.

It is possible to obtain an estimate of the trip time from a measurement of reference signals and these can be compared against expected values. The principle to obtain the initial trip time is to perform one or multiple measurements of reference signals transmitted by the satellite and to compare these measurements with the known expected values, which were stored in the UE previously. The comparison will deliver the best matching curve and therefore an estimation of the distance of the UE to the orbit plane, i.e. to UE's projection point in the orbit plane (cf. FIG. 6), $D_{U\text{-}PP}$ and the current phase time $T_P$. From these values, the trip time is derived. The details about how this is done are explained below.

In a first aspect of the current invention the estimation is based on RSS measurements from multiple satellites and some knowledge of relative positions of the measured satellites. Satellites may broadcast an identity information, e.g. in their system information, that provides indication of an order of the satellites on an orbit (index m in FIG. 2) and/or the orbit, the respective satellite belongs to (index n in FIG. 2). The comparison of two measurements performed by a UE on distinct downlink signals of different satellites that are known to be in different orbits shifted by one half flyover period (or 4.5 minutes in our LEO satellite examples) or any other fraction may then lead to a good estimation of the position of either of the satellites. Of course, real measurements may lead to more exact time values than the estimated ones explained above, e.g. seconds or fractions thereof.

The first aspect above may be enhanced by measuring RSS differences of two or more successive measurements with a certain timely distance. A satellite of rising RSS can be expected in the first half of its flyover and a degrading RSS may point to the second half. More precisely, the exact difference together with the absolute value may contribute a precise estimation of the phase time and the orbit plane distance.

In a second aspect of the invention the estimation is based on measurement of the Doppler frequency, i.e. measurement of the frequency deviation between the received signal and the transmitted signal caused by the relative speed of satellite and UE. Using the Doppler frequency is beneficial, as it is resistant against environmental effects like fast fading and scattering.

Using a Doppler frequency measurement is a good indication of the phase time and therefore of the relative position of the UE and the satellite. Using multiple Doppler frequency measurements to derive a Doppler frequency difference would even increase the position estimation accuracy.

Combining the two described methods of the first and second aspect above using RSS and Doppler frequency may further increase accuracy. One way of combination would be to firstly make two or more successive measurements of the Doppler frequency $f_{doppler}$ and calculate the ratio of inclination $\Delta f_{doppler}$ thereof, and at the same time make two or more successive measurements of the RSS. The values $f_{doppler}$ and $\Delta f_{doppler}$ are then compared with the curves of the expected Doppler frequencies for the different orbit plane distances. The curve with the smallest deviation to the measured inclination is selected, and the current phase time $T_P$ is taken from the intersection point of the selected curve and the measured value $f_{doppler}$.

As example, a measured value $f_{doppler}$=100 kHz is shown in FIG. 4 (shown as circles) and a relating $\Delta f_{doppler}$ (shown as straight solid lines through the circles). It could be seen, that the curve for 800 km orbit plane distance matches best to the measured $\Delta f_{doppler}$. The relating phase time is $T_{P1}$=110 s.

In the next step, an average value $RSS_{avg}$ is derived from the multiple measured RSS values. $RSS_{avg}$ is then compared with the curves of the expected RSS for different orbit plane distances at the derived phase time $T_{P1}$=110 s. This is depicted in FIG. 3, whereas $RSS_{avg}$=−111 dBm is assumed in this example. The value is between the curves for 800 km and 1200 km orbit plane distance. Therefore, the current orbit plane distance $D_{U\text{-}PP}$ is derived by linear interpolation as 1000 km.

Once the phase time and the distance to the orbit plane are derived, the distance UE-to-satellite $D_{U\text{-}S}$ and therefore the trip time can be calculated.

Figure 5:
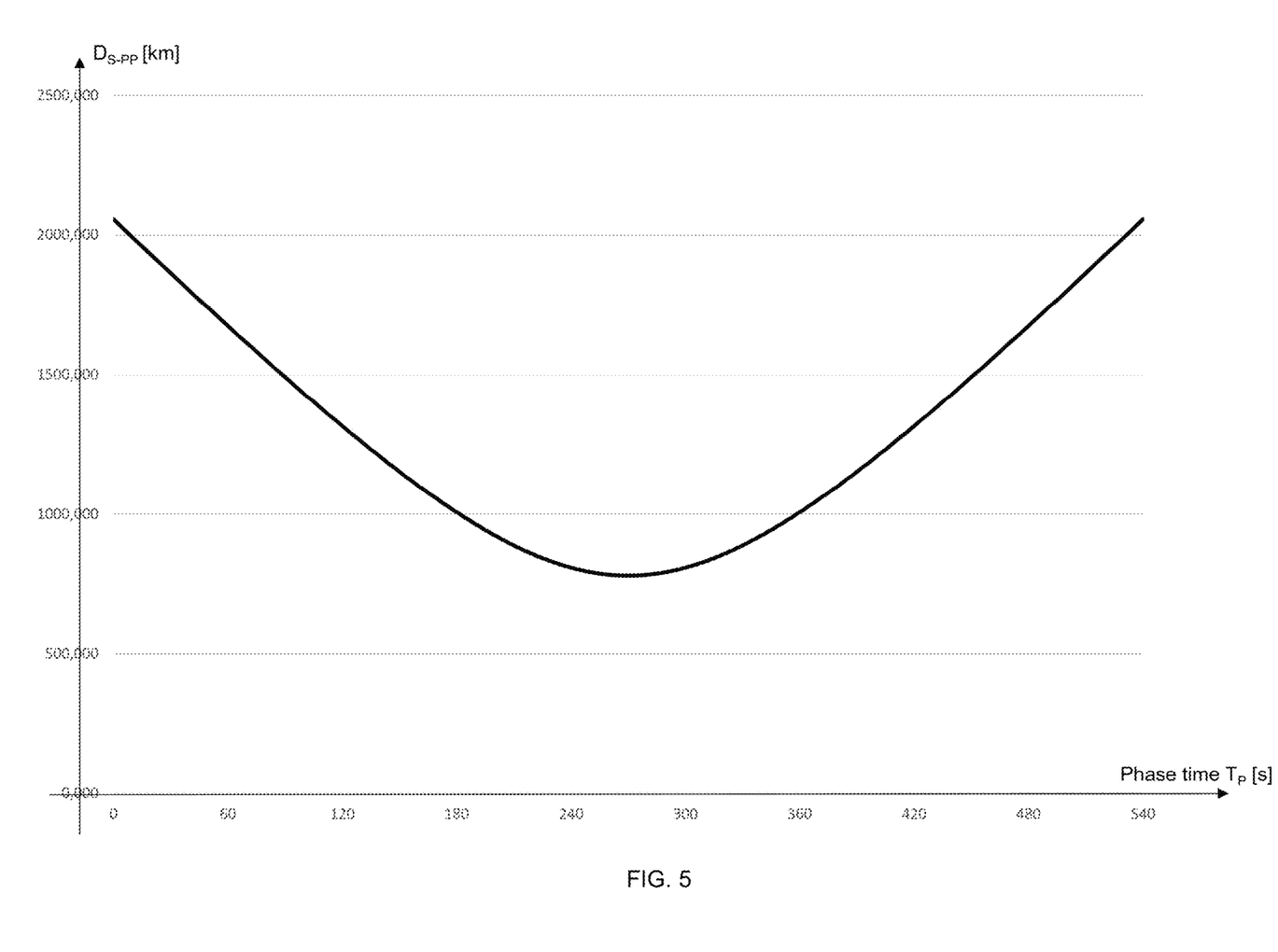
FIG. 5 shows an exemplary variation of a distance from a satellite to a UE's projection point on the orbit plane of a satellite with time.

The distance UE-to-satellite could be calculated as:

$$D_{U\text{-}S} = \sqrt{D_{S\text{-}PP}^2 + D_{U\text{-}PP}^2} \tag{3}$$

wherein $D_{U\text{-}S}$: The distance UE-to-satellite $D_{S\text{-}PP}$: The distance from the satellite to UE's projection point on the orbit plane $D_{U\text{-}PP}$: The distance from the UE to UE's projection point on the orbit plane The value for $D_{U\text{-}PP}$ is derived by the UE as described above and the value $D_{S\text{-}PP}$ is derived from calculations using the phase time and the satellites constellation. The course of $D_{S\text{-}PP}$ for LEO satellites is depicted in FIG. 5. The UE is either pre-configured with the calculation formula and the required parameters (orbit period, orbit altitude number of satellites per orbit, etc.) or the related values of $D_{S\text{-}PP}$ for multiple phase times are pre-configured.

The trip time can be calculated as $$t_{trip} = \frac{D_{U\text{-}S}}{c_l} \tag{4}$$

wherein $t_{trip}$: Is the trip time of signals transmitted from the UE to the satellite $D_{U\text{-}S}$: The distance from the UE to the satellite $c_l$: Is the speed of light that equals 299,792,458 m/s in vacuum There may be situations, where a reliable trip time cannot be derived by the UE. In this case the UE will detect such situation and will perform a different random access procedure, as described below.

After the UE has derived the initial trip time, it can simply derive the trip time of any time instance in the future. Therefore, the UE stores the latest derived trip time $t_{trip,latest}$, the time stamp $T_{latest}$, where this trip time was valid, the latest distance to the orbit plane $D_{U-PP}$, and The value n of the current orbit. The value n is derived e.g. from the satellite itself.

For the calculation of the future trip time, the related future phase time is required. Therefore, the UE firstly calculates the timely difference towards the latest and the future time instance and adds the latest phase time $T_{P,latest}$. Then the remainder of an Euclidean division (also known as "modular arithmetic") is calculated with mod $\Delta T_{sat}$, i.e. the timely distance of two successive satellites from the same orbit which is 540 seconds in case of Iridium satellites.

$$T_{P,new} = (T_{future} - T_{latest} + T_{P,latest} + T_{correct}) \bmod \Delta T_{Sat} \quad (5)$$

The value $T_{correct}$ is used to consider different timings of satellites from different orbits. $T_{correct} = 0$, if the current satellite is on the same orbit as the satellite used for latest trip time derivation. It is $\frac{1}{2}\Delta T_{Sat}$, if the new satellite is on a neighbouring orbit (n+1 or n−1) and neighbour orbits are shifted by half a flyover period, and it is in general:

$$T_{correct} = T_{shift} \times (n_{latest} - n_{new}) \Delta T_{Sat} \quad (6)$$

wherein $T_{shift}$: is the timely offset of satellites from neighboured orbits as perceived by a UE $n_{latest}$: is the orbit number of the satellite of which the latest trip time was stored in the UE $n_{new}$: is the orbit number of the satellite of which a new trip time should be derived With the new phase time and the stored latest orbit plane distance, the UE derives the new trip delay as described above.

This calculation leads to useful results, as far as UE's movement since the last trip time estimation is small. Or, more precisely, the trip time difference between the latest and the new derivation resulting from UE's movement is smaller than the preamble guard time. This is valid in most cases. For example, in case the guard interval of 0.684 ms is configured, the calculated trip time is usable at least for a horizontal movement up to 400 km.

Preamble transmissions with wrong transmit timings may lead to additional preamble collisions. To avoid transmissions with invalid trip times, the UE may use means to detect, whether a calculation of a future trip time is reliable. This is done e.g. by defining a maximum age of the latest trip derivation, e.g. 18 min. The expiration of this maximum age will require a new measurement as described above to derive the current trip time.

The methods described above assume usage of the slotted ALOHA principle for random access, because this will most likely also be used for satellite communications to the 3GPP network. In case that a correct reception timing within the access slot boundaries cannot be guaranteed by a given UE, the number of successful random access attempts will be degraded for all UEs in the related cell or random access would not be possible at all.

Therefore, it is one aspect of this invention to detect situations, were the trip time cannot be derived reliable. This may be e.g. if the RSS has very low values that are sufficient to connect to the satellite but too low to derive the trip time prior transmission of the random access preamble. The UE may detect this situation e.g. by comparing the currently measured RSS with a configurable threshold. In case the RSS is below this threshold, the trip time will not be derived by the UE. Instead the UE will use a different type of random access procedure, which is not based on the slotted ALOHA principle and which is not requiring the preambles to be received within access slot boundaries. I.e. a timing correction about the trip time is not required. Pure ALOHA is a usable principle. Compared to slotted ALOHA, the throughput of pure ALOHA is smaller, but still better than using slotted ALOHA where preambles will arbitrarily overlap with access slot boundaries. Therefore, it is beneficial to use slotted ALOHA, if preamble reception within the access slot boundaries could be guaranteed, and to use pure ALOHA, if the reliability of synchronous reception is too low.

When simultaneously applying different types of random access, it is important, that the receiver of the random access preambles (i.e. the satellite or the base station on ground) is aware, which type of random access is applied by the UE. Therefore, a first proposal is to use two different sets of random access preambles. A first set is used for slotted ALOHA mode, and a second set, for unsynchronised mode (e.g. pure ALOHA). The second set could either be derived by dividing the already specified preambles in two groups, or by defining new preambles for the second group. The UE can easily indicate the used random access type, by selecting a preamble from the relating preamble set. An alternative second proposal is to allocate separate resources in the time-frequency-domain for the two different random access approaches, e.g. different sub-carriers for slotted and non-slotted ALOHA.

As described above, using a common configuration for the random access response interval will lead to an unnecessary long delay of the random access procedure. Therefore, this invention proposes to derive the response interval individually for each UE from the current trip time. Additionally, the cell-specific configuration from the base station is considered. The beginning of the response interval in slotted ALOHA mode $T_{RAR,start,slotted}$ is calculated to be two times the trip time after the transmission of the relating preamble has ended:

$$T_{RAR,start,slotted} = T_{TX} + 2X \, t_{trip} + T_{preamble} \quad (7)$$

wherein $T_{TX}$: is a time where the transmission of the related preamble has begun $T_{preamble}$: is a duration of the related preamble The duration of the response interval is than taken from the configuration parameter as transmitted previously by the base station.

If a reliable trip time is not available and the UE has therefore selected the unsynchronised random access mode, the start of the response interval $T_{RAR,start,unsynchronised}$ is calculated from a parameter $T_{RAR,delay}$ transmitted by the base station:

$$T_{RAR,start,unsynchronised} = T_{TX} + T_{delay} + T_{Preamble} \quad (8)$$

wherein $T_{delay}$: is a time offset between transmission of a random access preamble and the beginning of the random access response window. This value is transmitted by the base station to the UE. It is selected by the base station to be at least 2 times the maximum trip time UE-to-satellite, e.g. 14 ms in case of LEO satellites.

Also in this case, the duration of the response interval is taken from the configuration parameter as transmitted previously by the base station.

In the following examples, a radio interface according to the LTE standard is assumed. This assumption is not to be understood as limiting the invention. The invention is also applicable for future mobile communication standards like 5G as specified at 3GPP.

According to the main aspect of this invention, UE1 is configured to derive a current signal trip time towards the satellite currently used for communication. UE1 is located within the coverage area of satellite $Sat_{n,m}$ (cf. FIG. 1). It has no active connection, i.e. it is in idle mode. The UE is configured to perform the random access procedure for connections towards satellites. It has stored values for the expected RSS and Doppler frequencies for several phase times and several orbit plane distances. Further it is configured with thresholds to detect unreliable measurements and to detect invalidity of stored trip times.

Step 1

UE1 is switched on and performs a cell search procedure. It selects $Sat_{n,m}$ to connect to the network. From the received signals transmitted by the satellite, the UE obtains the information that the link will be provided by a satellite. Further the UE has derived the random access configuration from the broadcasted system information. In addition to the parameters already specified for LTE, the satellite transmits parameters that define a second set of random access preambles to be used for unsynchronised random access.

Step 2

UE1 wants to perform a random access to $Sat_{n,m}$. As the link is provided via satellite, the UE will derive the trip time prior to preamble transmission. No stored value of the trip time is available in this example. Therefore, the UE starts measurement as described above to obtain the trip time.

Step 3

The UE selects a random access preamble and an access slot from the respective set for slotted-ALOHA mode. It calculates the transmit time using equation 1.

Step 4

The UE transmits the random access preamble and listens to the response. As the UE selected the slotted ALOHA mode, it calculates the beginning of the random access response interval $T_{RAR,start,slotted}$ as described above, i.e. it considers the current trip time. The duration of the interval is derived from the configured parameter as transmitted previously by the base station.

Step 5

The satellite receives the preamble. It calculates the time offset of the reception time from the access slot boundary and calculates a timing advance (TA) value. The behaviour is identical to a terrestrial base station. It sends a random access response message back to the UE including the TA value.

Step 6

The UE receives the response within the calculated time window and applies the TA value for the next transmission. Further it corrects the latest trip time value with the received TA value and stores the corrected value including a time stamp.

Step 7

Now the UE finalises the random access as usual for LTE.

The following steps may be used for a future trip time calculation:

Step 1'

UE1 is in idle mode and $Sat_{n,m+1}$ will be used for random access. The UE wants to perform a random access now, e.g. in order to transmit a Tracking Area Update (TAU).

Step 2'

As this is a satellite connection, the UE will derive the trip time prior preamble transmission. It uses the latest stored value and derives the current trip time as described above.

Step 3'

The UE performs the random access and proceeds with step 4 described in the message flow above followed by steps 5-7.

The following steps may be used for an unsynchronised random access:

Step 1"

UE1 is in idle mode and $Sat_{n,m+1}$ will be used for random access. The UE wants to perform a random access now.

Step 2"

As this is a satellite connection, the UE will derive the trip time prior preamble transmission. No stored value of the trip time is available in this example. Therefore, the UE starts measurement as described above to obtain the trip time. It detects, that the measurements will not be suitable for a reliable calculation of the trip time, e.g. because the measured RSS is below the configured threshold.

Step 3"

The UE will select the unsynchronised random access mode and selects a preamble and an access slot as configured for this mode.

Step 4"

The UE transmits the random access preamble and listens to the response. As the UE selected the unsynchronised random access mode, it calculates the beginning of the random access response interval $T_{RAR,start,unsynchronised}$ as described above, i.e. it considers the parameter $T_{delay}$, which was configured by the base station previously. The duration of the interval is derived from another parameter as transmitted previously by the base station.

Step 5"

The satellite receives the preamble. It calculates the time offset of the reception time from the latest access slot boundary and calculates a timing advance (TA) value. It sends a random access response message back to the UE including the TA value and the number of the access slot. The timing of this transmission after reception of the preamble is a fix value $T_{delay}$ pre-configured in the UE and to be used exclusively for the unsynchronised random access method.

Step 6"

The UE receives the response within the calculated time frame and adjusts the timing of the next transmissions according to the TA value and the access slot number. Further, it derives the trip time from the reception time and the transmission time. It has to be corrected about the value $T_{delay}$ with the following equation:

$$t_{trip}=\tfrac{1}{2}(T_{RX}-T_{TX}-T_{delay}) \quad (9)$$

As one result from the availability of a reliable trip time, the UE may use the slotted random access method for future random access attempts, at least for a specified time.

The following steps may be used to remove stored trip time values which becomes invalid:

Step 1*

The UE is in idle mode and $Sat_{n,m+1}$ will be used for random access. The UE wants to perform a random access now.

Step 2*

As this is a satellite connection, the UE will derive the trip time prior preamble transmission. It reads the latest stored value and detects, that the validity of this value is expired, i.e. due to the time stamp the value is older than allowed by the current configurations.

Step 3*

The UE will not use the stored value. Instead it deletes them and will derive a new trip time value from new measurements as described in steps 1 to 7 above.

What is claimed is:

1. A method of performing by a user equipment, UE, device a random access attempt in a communication system comprising at least one satellite transmission station, the method comprising:
    determining a trip time between the UE device and a non-terrestrial satellite transmission station of the communication system using orbit information of the satellite transmission station, the orbit information being known to the UE device; and
    using the trip time to determine a timing offset for a random access attempt transmission, and
    transmitting the random access attempt with the determined timing offset.

2. The method of claim 1, wherein the determined trip time is used to determine the timing offset for the access attempt transmission such that the access attempt transmission by the UE device is received at the satellite transmission station within a pre-determined time frame.

3. The method according to claim 1, wherein a second trip time between the UE device and the same or a different satellite transmission station is estimated using a pre-determined trip time and information relating to relative movement of one or more satellite transmission stations in the communication system.

4. The method according to claim 1 wherein the UE device makes a decision as to which of more than one random access methods to use for the access attempt transmission dependent of a reliability estimate of the trip time determination.

5. The method according to claim 1 wherein the trip time is used to determine a response time for reception of a response from the satellite transmission station.

6. The method according to claim 1, wherein the satellite transmission station is a satellite in low earth orbit.

* * * * *